United States Patent [19]
Curry et al.

[11] Patent Number: 5,489,739
[45] Date of Patent: Feb. 6, 1996

[54] METHOD FOR DISPOSING NATURALLY OCCURRING RADIOACTIVE MATERIAL WITHIN A SUBTERRANEAN FORMATION

[75] Inventors: Angela S. Curry, Houston; Keith A. Seilhan, Longview, both of Tex.; Charles A. LeBlanc, LaFayette, La.

[73] Assignee: Amoco Corporation, Chicago, Ill.

[21] Appl. No.: 176,350

[22] Filed: Dec. 30, 1993

[51] Int. Cl.⁶ .................................................. B09B 1/00
[52] U.S. Cl. ........................ 588/250; 220/900; 220/908; 220/913; 220/DIG. 14; 405/128
[58] Field of Search .................................. 405/128, 129; 588/249, 250, 259; 220/203, 367, 900, 908, 913, DIG. 14; 250/506.1; 166/285, 292

[56] References Cited

U.S. PATENT DOCUMENTS

| | | |
|---|---|---|
| 3,513,100 | 5/1970 | Stogner . |
| 3,659,108 | 4/1972 | Quase . |
| 3,754,141 | 8/1973 | Leebl et al. . |
| 3,799,821 | 3/1974 | Jones .................. 220/DIG. 14 X |
| 4,234,447 | 11/1980 | Hay et al. . |
| 4,362,434 | 12/1982 | Vaiiga et al. .......................... 405/128 |
| 4,376,489 | 3/1983 | Clemens ............................ 220/900 X |
| 4,453,857 | 6/1984 | Serra et al. .............................. 405/128 |
| 4,518,507 | 5/1985 | Conner .................................. 210/747 |
| 4,756,852 | 7/1988 | Temus ............................ 250/506.1 X |
| 4,784,802 | 11/1988 | Mallory et al. ...................... 405/129 X |
| 4,950,426 | 8/1990 | Markowitz et al. ................. 405/129 X |
| 5,042,679 | 8/1991 | Crowson et al. ................. 250/506.1 X |
| 5,073,305 | 12/1991 | Miyao et al. ..................... 250/506.1 X |
| 5,102,615 | 4/1992 | Grande et al. ................... 250/506.1 X |
| 5,125,532 | 6/1992 | Casagrande ...................... 250/506.1 X |
| 5,164,123 | 11/1992 | Goudy, Jr. .............................. 252/628 |
| 5,199,488 | 4/1993 | Kasevich et al. ...................... 166/248 |
| 5,202,522 | 4/1993 | Williams ................................ 588/250 |
| 5,303,836 | 4/1994 | Childress ........................... 220/900 X |
| 5,336,843 | 8/1994 | Zimmer ................................ 588/249 |
| 5,338,493 | 8/1994 | Welch ............................... 405/128 X |

Primary Examiner—John A. Ricci
Attorney, Agent, or Firm—Charles P. Wakefield; Richard A. Kretchmer

[57] ABSTRACT

A method for disposing of radioactive material in a disposal area, which is accessible from the surface through a wellbore which contains a wellbore fluid. The method comprises the steps of: encapsulating the radioactive material within a container, placing the container in the wellbore, passing the container through the wellbore to the disposal area, and equalizing the differential pressure between the wellbore pressure and internal pressure within the container as the capsule descends within the wellbore, prior to the differential pressure reaching a magnitude which would exceed a design collapse rating of the container.

24 Claims, 4 Drawing Sheets

5,489,739

METHOD FOR DISPOSING NATURALLY OCCURRING RADIOACTIVE MATERIAL WITHIN A SUBTERRANEAN FORMATION

FIELD OF THE INVENTION

The present invention is directed to a method and an apparatus for disposing of radioactive waste and more particularly to a method and an apparatus for disposal of naturally occurring radioactive material, hereinafter referred to as "NORM" within a subterranean formation.

BACKGROUND OF THE INVENTION

Trace amounts of radioactive material are brought to the surface during the production of hydrocarbons from subterranean formations. The radioactive material is typically suspended in formation waters produced from a reservoir and is carried to the surface with the waters. The radioactive material collects on metal surfaces and therefore tends to concentrate and accumulate on the inner surfaces of oil field tubulars and production equipment, such as storage tanks. The radioactive materials, which contaminate surface tubulars and equipment, are generally referred to as NORM. This NORM needs to be periodically removed from the oil field tubulars and production equipment. The removed NORM poses a potential environmental and health hazard and must be disposed of in an approved manner.

U.S. Pat. No. 5,202,522, to Williams discloses a method for disposing of radioactive material within a stable geological hydrocarbon-containing formation. The formation is penetrated by a steel tubular member and a concrete plug is set at the bottom of the tubular member. In the method, radioactive waste is mixed with concrete and pumped into the steel tubular member. Once the desired quantity of concrete has been added, the top of the steel tubular member is sealed off with clean concrete which does not contain radioactive material. The method is difficult to utilize because it requires mixing the radioactive material with concrete which then must be pumped into the steel tubular member to the region that will form the disposal area. The concrete slurry is difficult to work with and may spill during handling. Also, it must not be allowed to solidify before it reaches the disposal area. Additionally, the concrete slurry is viscous and heavy, and requires the use of complex handling and delivery equipment which usually must be decontaminated, further adding to the cost of disposing of the material.

What is desired is a method for disposing of NORM in a subterranean formation which provides for efficient handling and disposal of the NORM, while ensuring that the NORM is properly contained during storage, transportation, and handling.

SUMMARY OF THE INVENTION

The general object of this invention is to provide a method and an apparatus for the downhole disposal of radioactive material. A more specific object of this invention is to provide a method and an apparatus for disposing NORM which utilizes capsules made of lightweight materials, such as polyvinyl chloride, for storing and transporting the NORM to the downhole disposal area. Other objects of the present invention will appear hereinafter.

One embodiment of the invention is a method for disposing of radioactive material in a disposal area, accessible from the surface through a wellbore, the wellbore containing fluid and having a wellbore pressure A, the method comprising the steps of: (a) encapsulating the radioactive material within a container, the container having void space between the particles of radioactive material and having an internal pressure B; (b) placing the container in the wellbore; (c) passing the container through the wellbore to the disposal area; and (d) equalizing the differential pressure between A and B at a magnitude less than the magnitude which would exceed a design collapse rating of the container.

In a second embodiment of the invention an apparatus is disclosed for transporting radioactive material to a downhole disposal area, the downhole disposal area being accessible from the surface through a wellbore, the wellbore containing fluid and having a wellbore pressure which increases with depth beneath the earth's surface, comprising: a body having a design collapse rating which will be exceeded by the forces which act on the body as a result of the pressure within the downhole disposal area; radioactive material placed within the body, the body having an internal pressure; and means for equalizing the internal pressure with the wellbore pressure as the body descends within the wellbore to prevent the design collapse rating from being exceeded.

The disposal method of the current invention provides an efficient and cost effective means for disposing of NORM. It was discovered after extensive experimentation that a capsule could be utilized to contain and deliver NORM to a downhole disposal site, the capsule having a design collapse rating less than the wellbore pressure which would typically be exerted on the outside of the capsule as it descends within the wellbore.

The "design collapse rating" is a measure of the external stress required to deform a capsule. The calculation of a design collapse rating for a thin wall capsule is known to one of ordinary skill in the art. Examples of methods for calculating the design collapse rating for a capsule constructed of plastic, such as polyvinyl chloride (PVC), are disclosed in American Society For Testing And Materials (ASTM), Standards D-1784 and D-1785.

The use of a capsule having such a collapse rating is facilitated, in the current invention, by a pressure equalization valve which is installed in the capsule. The equalization value is designed to open before the forces acting on the capsule, as a result of the external pressure within the wellbore, exceed the design collapse rating of the capsule. The capsule therefore is able to maintain its structural integrity as it descends to the downhole disposal site.

The use of an equalization valve allows lighter weight materials to be utilized in the construction of capsules used for disposing of radioactive material. The use of lighter weight materials will enable capsules to be constructed, which provide efficient storage and transport of radioactive material on the surface without the need for expensive handling equipment such as cranes.

Numerous other advantages and features of the present invention will become readily apparent from the following detailed description of the invention, the embodiments described therein, from the claims, and from the accompanying drawings.

DETAILED DESCRIPTION OF THE INVENTION

Figure 1:
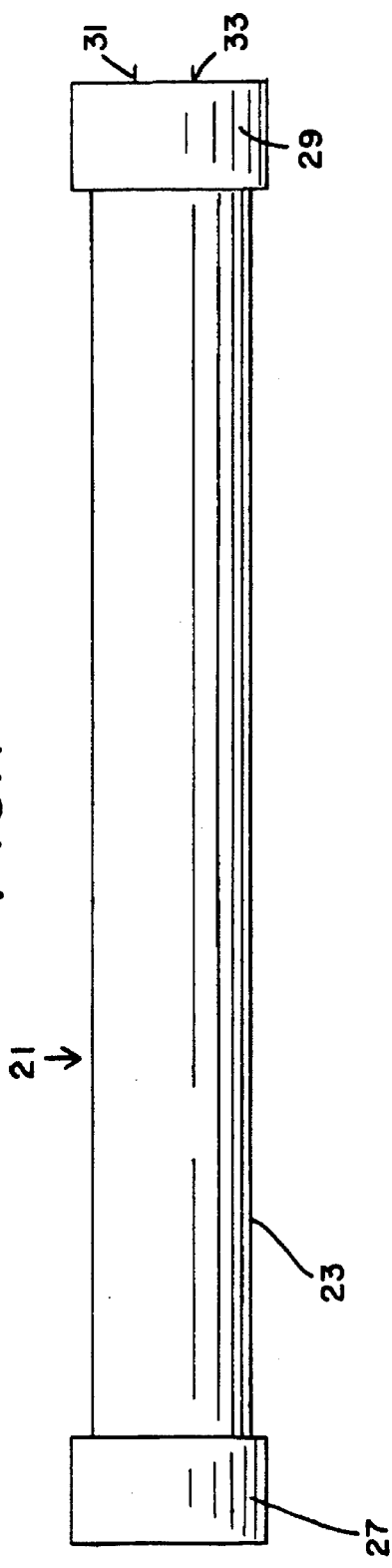
FIG. 1 is a side view of a capsule containing NORM.

While this invention is susceptible of embodiment in many different forms, there is shown in the drawings, and will herein be described in detail, specific embodiments of the invention. It should be understood, however, that the present disclosure is to be considered an exemplification of the principles of the invention and is not intended to limit the invention to the specific embodiments illustrated.

Briefly, the present invention utilizes a lightweight capsule for transporting NORM to a downhole disposal site. The capsule utilizes equalization means, such as a pressure equalization valve, which allows the pressure within the capsule to equalize with the wellbore pressure as the capsule descends within a wellbore to the downhole disposal site. This will facilitate the use of a capsule having a design collapse rating which is less than the forces which will be exerted on the outside surface of the capsule, as a result of the increasing wellbore pressure, as the capsule descends within the wellbore.

The equalization means is designed so that as the capsule containing NORM descends within the wellbore and the external pressure exerted on the capsule increases, the equalization means allows wellbore fluid to enter the capsule and equalize the pressure between the interior of the capsule and the wellbore. The equalization means does not have to ensure complete equalization of pressure between the inside of the capsule and the wellbore; it should, however, be designed so that the differential pressure between the inside of the capsule and the wellbore is not large enough to create forces which will exceed the design collapse rating of the capsule. This will assist in maintaining the integrity of the capsule as it descends within the wellbore. Additionally, preferably the equalization means allows fluid to enter the interior of the capsule, but under normal operating conditions does not allow fluid to flow out of the capsule. This reduces the chance of NORM seeping from the capsule to the wellbore during its descent to the wellbore disposal area.

Turning now to the drawings, FIG. 1 illustrates a capsule 21 as used in the current invention; the capsule 21 has a cylindrical hollow body 23 in which is placed NORM. The capsule 21 is preferably filled with NORM, but there will usually be a small amount of void space within the capsule near the ends and between the particles of radioactive material. Over each end of the body 23 is located a cap 27 and 29 respectively. The body 23 and caps 27 and 29 are preferably constructed of a lightweight durable material, such as schedule 40 polyvinyl chloride. The body 23 and the caps 27 and 29 are typically welded together using a polyvinyl chloride cement.

Polyvinyl chloride is the preferred material to be used for several reasons, including: 1) it is characterized by a relatively high resistance to corrosion and chemical attack by acid and other chemicals; 2) it is lightweight; 3) it is easy to work with when cutting, drilling and applying fittings; and 4) it is readily available and relatively inexpensive when compared to other materials such as metal tubing.

Figure 4:
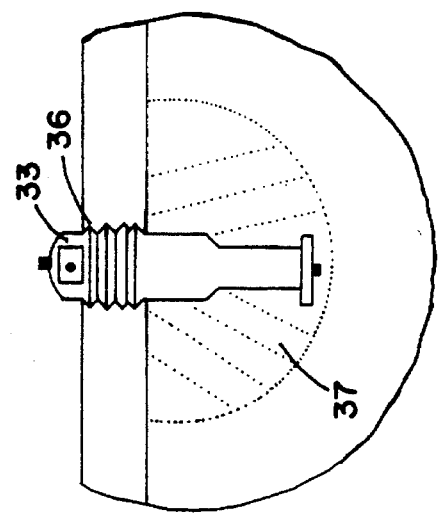
FIG. 4 is is a detail view showing one embodiment of a pressure equalization means as utilized in the current invention.
Figure 3:
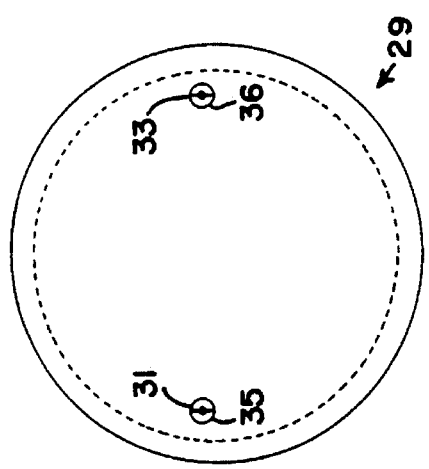
FIG. 3 is an expanded top view of the cap shown in FIG. 2.
Figure 2:
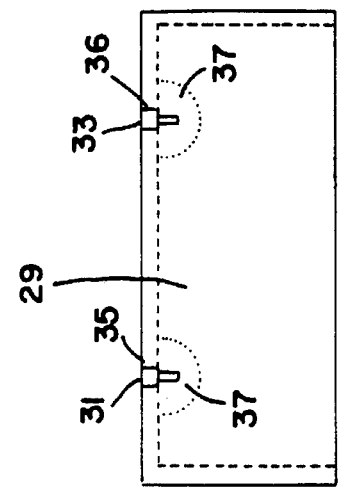
FIG. 2 is an expanded side view of the cap shown in FIG. 1, which contains pressure equalization means.

FIGS. 2, 3, and 4 are expanded views of the cap 29 which show in detail an example of a typical equalization means used by the current invention. The equalization means comprises pressure equalization valves 31 and 33 which are self-threaded into holes 35 and 36 located in cap 29. Valves 31 and 33 are preferably one-way check valves that allow fluid to flow from the wellbore into the interior of capsule 21, but not in the opposite direction. A sealing material 37, preferably a silicon based sealer, covers the portion of valves 31 and 33 which extend into the interior of the capsule 21. The sealing material 37 ensures the NORM remains sealed within the capsule 21 if the valves 31 and 33 fail during storage and/or transport of the capsule 21.

Capsule Design

The capsule design must satisfy storage and handling requirements for the NORM. Preferably, the capsule should be small enough to be manipulated and repositioned by hand. This will greatly reduce the handling machinery and equipment required, thereby reducing the cost of disposing of the NORM. Also, a smaller size will minimize concerns over storage of capsules and allow capsules to be stored temporarily in available racking systems. When determining what size of capsule to use, the advantages of a smaller size, such as ease of handling and storage, must be balanced against the increased number of capsules necessary to dispose of a given quantity of NORM when smaller capsules are utilized.

In addition to the above considerations, the capsule should be designed to maintain its structural integrity during the descent to the selected downhole disposal site. By maintaining the structural integrity of the capsule, leakage of NORM is minimized. Also, if the integrity of the capsule were breached, it would be more likely that the capsule could deform in shape and cause an obstruction of the wellbore.

As discussed earlier, to ensure that the structural integrity of the capsule is maintained, the capsule should be designed so that the equalization means allows fluid to enter the interior of the capsule before the differential pressure between the wellbore and the interior of the capsule is large enough to create forces which will exceed the design design collapse rating of the capsule. It has been determined that if the capsule is designed to withstand the pressure and pressure changes that occur during its descent within a wellbore, it will also maintain its structural integrity with the given temperature changes that occur during its descent to the disposal site.

Therefore, in order to determine the design requirements for a capsule, the pressure and pressure changes which act on the capsule during its descent must be determined. This will facilitate the determination of a size of equalization means to utilize in a given capsule.

The pressure within a wellbore changes as a function of the depth within the wellbore according to:

$$P_{wellbore} = Depth \times Density_{Brine} \times (0.052) \quad (1)$$

where:

$P_{wellbore}$ is the pressure in the wellbore at a given depth measured in pounds per square inch;

Depth is measured in feet;

Density$_{Brine}$ is measured in pounds per gallon; and 0.052 is a correction factor to relate foot pounds per gallon to pounds per square inch.

Figure 5:
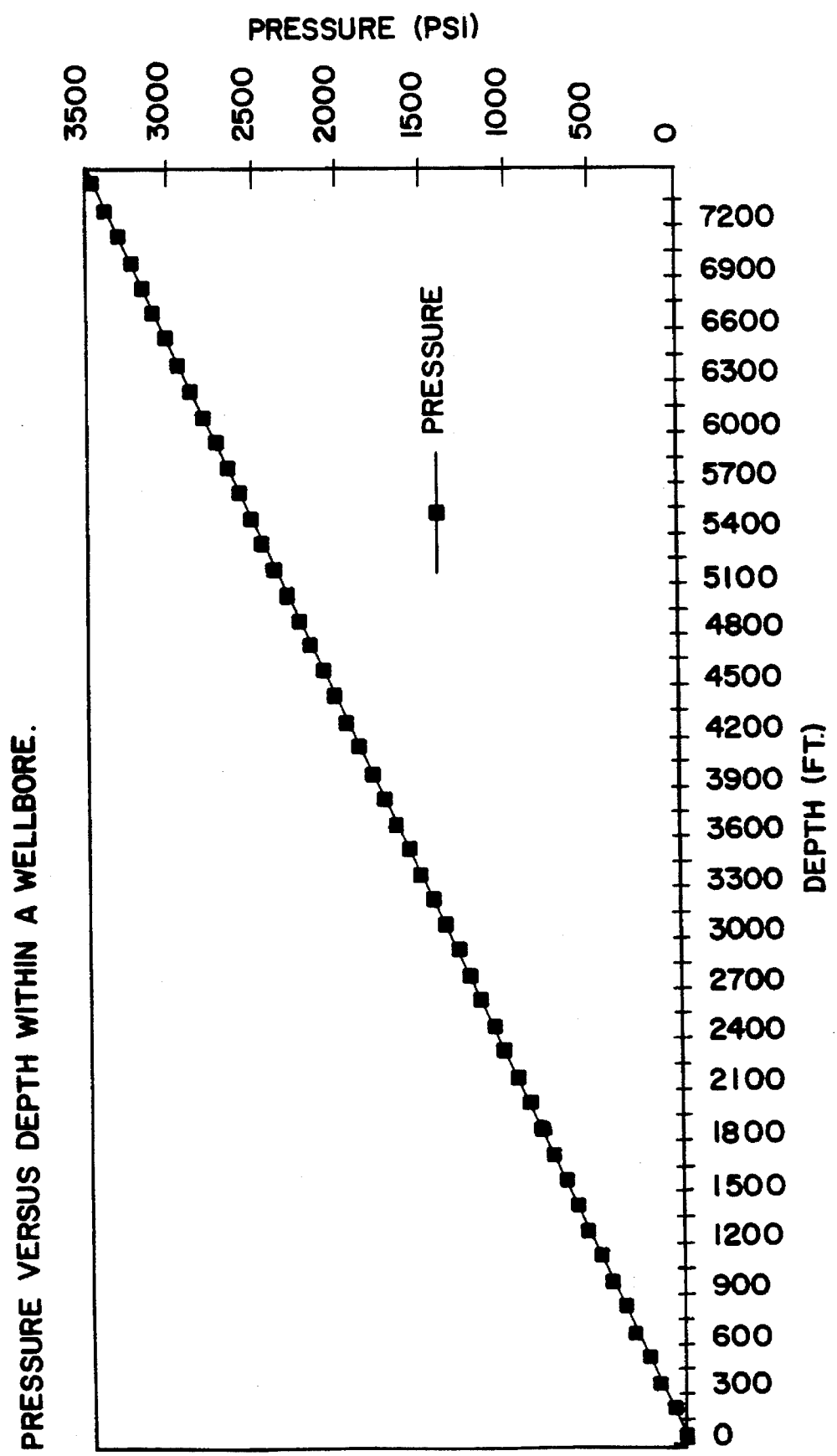
FIG. 5 is a graphical representation of wellbore pressure versus depth beneath the surface in a typical wellbore.

As can be seen from Equation 1, the change in pressure within the wellbore with respect to depth is linear. For a typical wellbore filled with about 9.0 to about 9.5 pound per gallon (ppg) brine, the pressure changes approximately 500 psi per 1000 ft. FIG. 5 displays the calculated pressure as a function of depth within a wellbore for a typical well.

To determine the rate of change of the pressure acting on the capsule as it descends within a wellbore, equation (1) should be used together with an estimate of the rate of descent of the capsule within the wellbore. An estimate of the typical rate of descent of a capsule can be developed from a free body diagram of the forces acting on a capsule within the wellbore.

The free body diagram of a capsule in a wellbore results in the following expression for the acceleration of the capsule within the wellbore.

$$m_c a_c = W - B - D \qquad (2)$$

where:

$m_c$ is the mass of the capsule;

$a_c$ is the acceleration of the capsule;

W is the weight of the capsule with the NORM enclosed;

B is the buoyancy of the capsule; and

D is the drag forces acting on the capsule.

It should be noted that the free body diagram used to develop equation (2) does not take into account the friction between the wellbore and the capsule. This may result in a value for the velocity of the capsule which is greater than the actual velocity, and therefore may result in a higher estimated pressure change acting on the capsule than actually occurs. By using the estimated pressure change, a capsule design will result which is more conservative than if the actual pressure changes were used. As the difference in size between the diameter of the wellbore and the diameter of the capsule becomes greater, the friction between the wellbore and the capsule becomes less significant and the difference between the actual velocity and the calculated velocity becomes smaller.

The necessary parameters can be used with equation (2) to estimate the acceleration and velocity of a capsule within a wellbore as it descends toward a disposal site. For a typical capsule constructed of schedule 40 PVC, which is four inches in diameter by six feet long, with a five inch diameter cap and which is filled with NORM: the weight of the capsule and NORM is about 58.7 lbf; the buoyancy of the capsule is typically about 44.6 lbf for a wellbore containing about 9.0 pounds per gallon fluid; and the drag force is determined to be about 0.117 $V_c^2$, where $V_c^2$ is the square of the velocity of the capsule within the wellbore. This drag force takes into account the pressure and viscous shear forces exerted on the capsule. But, it does not take into account the shear forces created by the capsule's travel through a conduit, such as a wellbore.

Figure 6:
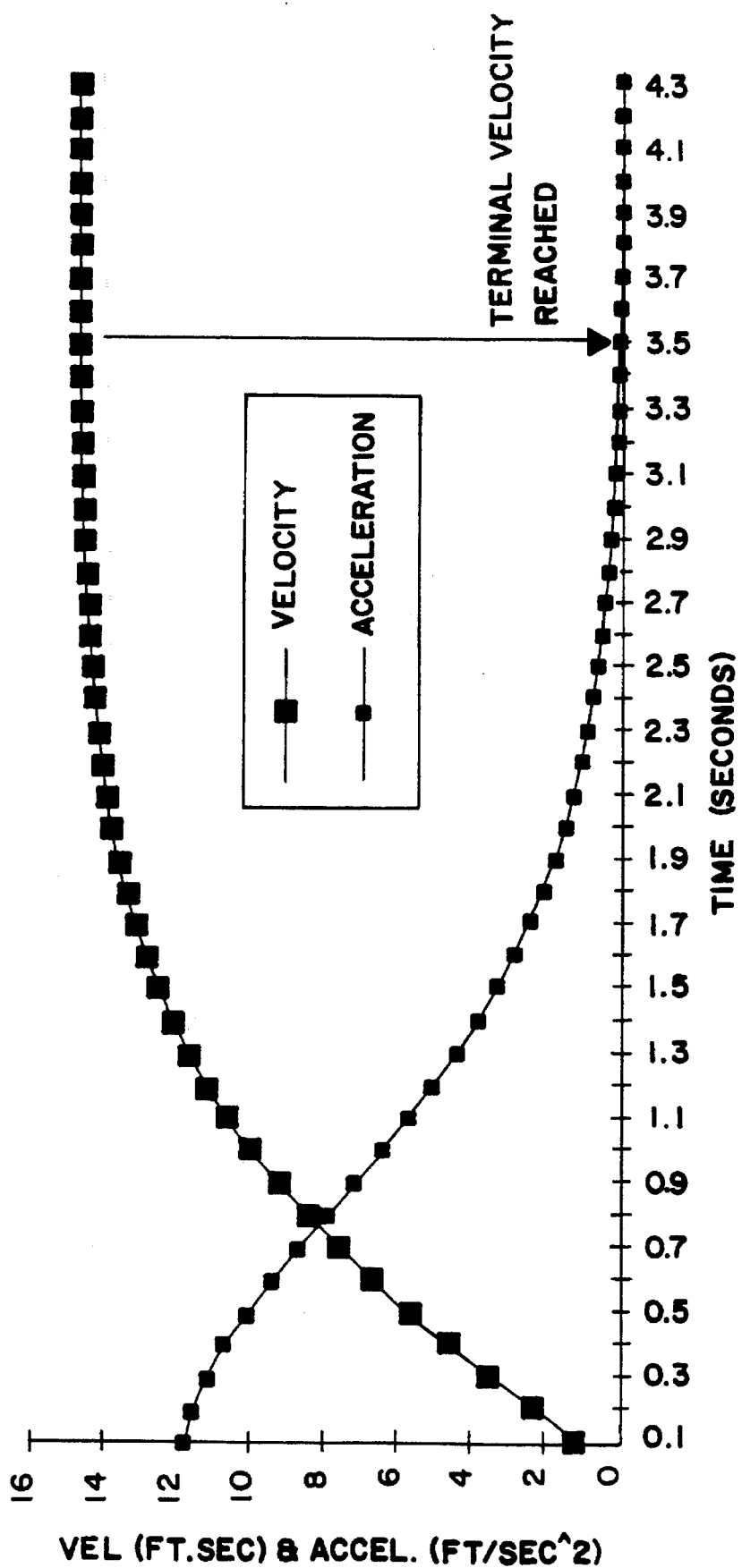
FIG. 6 is a graphical representation of the velocity and acceleration of a typical capsule within a wellbore as a function of time.

FIG. 6 displays the velocity and acceleration of a capsule having the parameters listed above. As can be seen from FIG. 6, the capsule will reach a terminal velocity of about 14.9 ft/sec after approximately 3.5 seconds. Using the calculated terminal velocity of 14.9 ft/sec and Equations 1, the maximum rate of pressure increase acting on the capsule is calculated to be about 420 p.s.i. per minute. For the typical capsule described above, the equalizing means is designed to open at about 40 p.s.i. and allow wellbore fluid to flow into the capsule. The equalization means is also designed so that the differential pressure between the inside of the capsule and the wellbore does not exceed the design collapse rating of the capsule while the wellbore pressure is increasing at about 420 p.s.i. per minute. This will help ensure the structural integrity of the capsule is maintained as the capsule descends to the downhole disposal site.

Disposal Area

The NORM is disposed of in a downhole disposal area. Preferably, the disposal area comprises a wellbore casing located in a stable geological formation. The bottom end of the wellbore casing is sealed off from the formation, preferably using concrete. The capsules containing NORM are placed within the wellbore casing to the desired level and then the top of the wellbore casing is sealed off from the formation, preferably using concrete.

Figure 7:
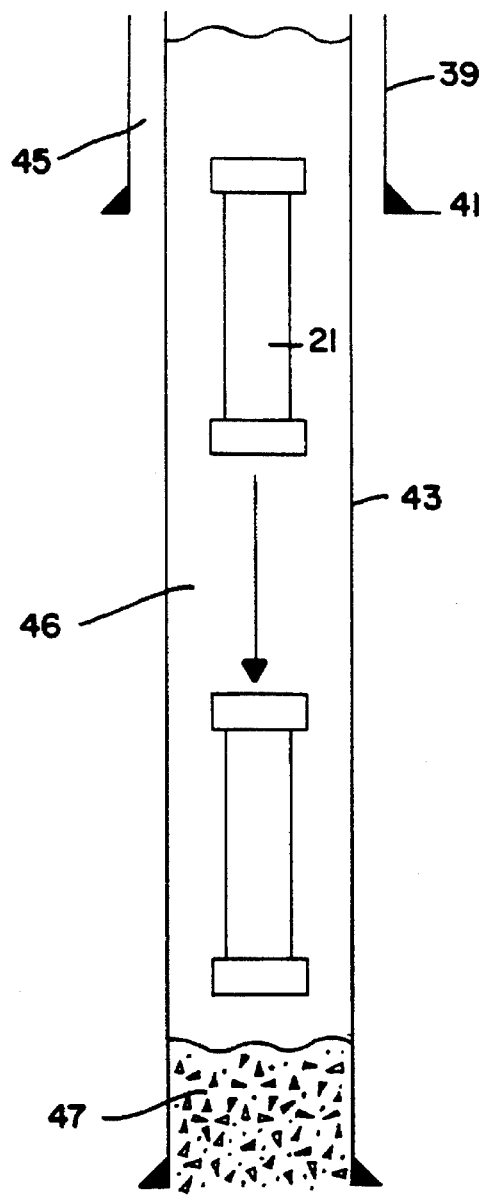
FIG. 7 is a cross sectional view of a typical disposal area utilized in the current invention while capsules are descending within it.

Specifically, turning now to the drawings, FIG. 7 illustrates a typical downhole disposal area for NORM as utilized in the current invention. Typically, a well is utilized which was previously drilled for oil and/or gas production. The well has surface casing 39 that extends from the surface to a desired depth below the surface. The surface casing 39 was originally used to anchor blowout preventers and prevent the pollution of near surface, fresh water aquifers by recovered hydrocarbons and/or drilling mud. The surface casing 39 terminates in a surface casing shoe 41, which anchors the surface casing to the subterranean formation surrounding the surface casing. The surface casing shoe 41 is preferably located at least 100 feet below the lowermost formation which contains drinking water.

Extending beneath the surface casing 39 is production casing 43. The production casing is smaller in diameter than the surface casing 39, and rides within the surface casing 39 for a short distance.

An annulus 45 is formed where the surface casing 39 and the production casing 43 overlap. The production casing 43 may penetrate a formation that contains hydrocarbons. The production casing 43 may have perforations in the region penetrating a hydrocarbon containing formation.

A lower cement plug 47, within the production casing 43, which extends across the entire hydrocarbon containing region forms the lower boundary of the NORM disposal area 46. The plug 47 should preferably extend at least an additional 100 feet above any casing perforation.

The region of the production casing 43, which is located above the plug 47, will normally form the inner boundary of the NORM disposal area 46. If corrosion of the production casing 43 is a serious concern, an inner liner may be placed within the production casing 43 to line the inside of the NORM disposal area 46. The production casing 43 prevents fluid from entering the disposal area 46 and also maintains the shape and structural integrity of the disposal area. The disposal area 46 extends upward to a desired depth below the surface.

Figure 8:
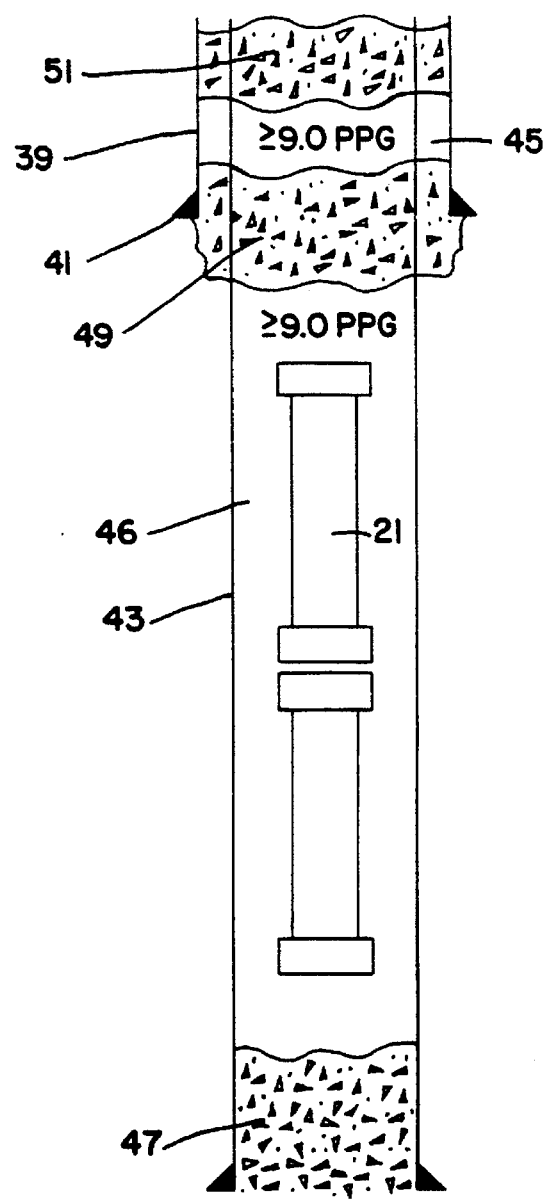
FIG. 8 is a side cross sectional view of the disposal area shown in FIG. 7 with its top sealed by cement plugs.

Referring to FIG. 8, the capsules 21 filled with NORM descend within the wellbore to the disposal area 46. Once the disposal area is filled to the desired level, the top is sealed to isolate the disposal area 46 from the wellbore. The top of the disposal area is preferrably sealed with an upper cement plug 49, which is placed across the top of production casing 43. The upper cement plug 49 preferably fills the production casing 43 for at least fifty feet above and fifty feet below the casing shoe 41. Also, the annulus 45, between the production casing 43 and surface casing 39, is preferably filled with cement for a distance of at least 50 feet above the bottom of the casing shoe 41. In the most preferred embodiment of the invention an additional surface plug 51 is utilized to further isolate the disposal area 46 from the surface.

Referring to FIGS. 1 through 8, the disposal of NORM is carried out in the following manner:

1. With the lower cement plug 47 in place perform a pressure test of the plug 47 and the production casing 43 above the plug. Typically, the test is carried out at 1000 p.s.i.g. and a satisfactory test is obtained when the pressure drops 100 p.s.i.g. or less over a thirty minute period.

2. After a satisfactory pressure test is obtained, check the wellbore casing for restrictions which could impede the descent of capsule 21 to the disposal area 46. Preferably, the wellbore casing will have no restrictions which result in the casing being less than about 90% of its rated internal diameter.

3. Before placing the capsules 21 in the wellbore ensure that the wellbore is filled with the desired fluid. Preferably, the wellbore is filled with at least about 9.0 pound per gallon fluid. This will allow allow the same fluid which provided wellbore control during placement of the lower cement plug 47 to be utilized during the disposal of the NORM. Also, a wellbore containing at least 9.0 pound per gallon brine fluid will increase the buoyancy of the capsule and therefore slow its descent to the disposal area.

4. Calculate the number of capsules 21 that will fill the production casing 43 to the desired level. For the majority of applications, the capsules 21 should preferably fill the production casing 43 to a level no higher than 500 feet below the surface casing shoe 41.

5. Insert the capsules 21 filled with NORM into the wellbore and allow them to descend to the downhole disposal area 46. It may be advantageous to check the level of the capsules 21 within the production casing 43 after one half of the capsules 21 have been inserted and again when a sufficient number of capsules 21 have been inserted for the capsules to reach a level approximately 1000 feet below the bottom of the surface casing shoe 41.

6. Once the desired number of capsules 21 have been placed in the wellbore the disposal area 46, the disposal area 46 should be sealed on the top by placing an upper cement plug 49 in the wellbore above the disposal area. Preferably the upper plug 49 fills at least 50 feet of the annulus 45 formed between the production casing 43 and the surface casing 39. Also, preferably the upper plug 49 extends within the production casing 43 to the level at least fifty feet below the surface casing shoe 41. The upper cement plug 49 should be pressure tested in a manner similar to that used to pressure test the lower cement plug 47. A surface cement plug can be utilized to further isolate the downhole disposal area from the surface.

From the foregoing description, it will be observed that numerous variations, alternatives and modifications will be apparent to those skilled in the art. Accordingly, this description is to be construed as illustrative only and is for the purpose of teaching those skilled in the art the manner of carrying out the invention. Various changes may be made, materials substituted and features of the invention may be utilized. For example, a concrete crypt or lined cavern may be used instead of the cased wellbore to receive the NORM filled capsules. The ends of the capsule may be sealed with end plates instead of caps and if caps are utilized they may be screwed onto the body of the capsule instead of being welded in place. Additionally, the invention may be utilized to dispose of other types of waste besides radioactive material, including hazardous waste.

Thus, it will be appreciated that various modifications, alternatives, variations, etc., may be made without departing from the spirit and scope of the invention as defined in the appended claims. It is, of course, intended to cover by the appended claims all such modifications involved within the scope of the claims.

That which is claimed is:

1. A method for disposing of radioactive material in a disposal area accessible from the surface through a wellbore, the wellbore containing fluid and having a wellbore pressure A, the method comprising the steps of:

(a) encapsulating the radioactive material within a container, the container having void space between the particles of radioactive material and having an internal pressure B;

(b) placing the container in the wellbore;

(c) passing the container through the wellbore to the disposal area; and (d) equalizing a differential pressure between A and B to maintain a magnitude of the differential pressure between A and B less than the magnitude which would exceed a design collapse rating of the container.

2. The method of claim 1, wherein the radioactive material comprises naturally occurring radioactive material.

3. The method of claim 2, wherein the disposal area comprises a tubular member sealed at the bottom, the method further comprising the steps of:

(e) filling the tubular member to the desired level with containers; and (f) sealing the top of the tubular member.

4. The method of claim 3, wherein the bottom of the tubular member is sealed with a first concrete plug and the top of the tubular member is sealed with a second concrete plug.

5. The method of claim 4, wherein the tubular member comprises wellbore casing which has perforations in a region penetrating a hydrocarbon containing formation and wherein the first concrete plug extends within the wellbore casing to a level at least about 100 feet above an uppermost casing perforation.

6. The method of claim 4, further comprising isolating the surface from the disposal area by placing a third concrete plug within the wellbore between the disposal area and the surface.

7. The method of claim 6, wherein the third plug is at least 100 feet in length.

8. The method of claim 2, further comprising the step of obtaining a satisfactory pressure test of the disposal area at a pressure of about 1000 p.s.i.g. prior to performing step(b).

9. The method of claim 8, wherein a satisfactory test is obtained when the pressure drops 100 p.s.i.g. or less over at least a thirty minute period of time.

10. An apparatus for transporting radioactive material to a downhole disposal area, the downhole disposal area being accessible from the surface through a wellbore, the wellbore containing liquid and having a wellbore pressure which increases with depth beneath the earth's surface, comprising:

a body having a design collapse rating which will be exceeded by the forces which act on the body as a result of the pressure within the downhole disposal area;

radioactive material placed within the body, the body having an internal pressure; and means for allowing liquid to flow from the wellbore into the body for equalizing the internal pressure with the wellbore pressure as the body descends within the wellbore to prevent the design collapse rating from being exceeded.

11. The apparatus of claim 10, wherein the body is constructed of a material comprised of polyvinyl chloride.

12. The apparatus of claim 11, wherein the means for allowing liquid to flow from the wellbore into the body comprises a pressure equalization valve.

13. The apparatus of claim 11, wherein the means for allowing liquid to flow from the wellbore into the body comprises at least two pressure equalization valves.

14. The apparatus of claim 11, wherein the body comprises a tubular member and end caps which seal the ends of the tubular member.

15. The apparatus of claim 14, wherein the means for allowing liquid to flow from the wellbore into the body is located within one of the end caps.

16. The apparatus of claim 15, wherein the means for allowing liquid to flow from the wellbore into the body comprises a pressure equalization valve.

17. The apparatus of claim 16 having two pressure equalization valves located in one of the end caps.

18. The apparatus of claim 17, wherein the body has a design collapse rating of about 45 to 50 p.s.i. and the pressure equalization valves open and allow wellbore fluid to flow into the body at about 40 p.s.i.

19. The apparatus of claim 10, wherein the radioactive material comprises naturally occurring radioactive material.

20. An apparatus for disposing of radioactive material, comprising:

a wellbore containing a fluid, the wellbore having a wellbore pressure which increases with depth beneath the earth's surface;

a downhole disposal area for receiving radioactive material, the downhole disposal area being accessible from the earth's surface through the wellbore;

a container for placement within the downhole disposal area, the container having a design collapse rating which will be exceeded by the forces which act on the container as a result of the pressure within the downhole disposal area;

radioactive material placed within the container, the container having an internal pressure; and a pressure equalization valve for equalizing the internal pressure with the wellbore pressure as the container descends within the wellbore to prevent the design collapse rating from being exceeded.

21. The apparatus of claim 20, wherein the downhole disposal area comprises a tubular member sealed at the bottom with a concrete plug.

22. The apparatus of claim 20, wherein the container is constructed of polyvinyl chloride.

23. The apparatus of claim 20, wherein the pressure equalization valve allows enough fluid to flow from the wellbore into the container to prevent the design collapse rating from being exceeded as the wellbore pressure increases at a rate of 420 p.s.i. per minute.

24. The apparatus of claim 20, wherein the wellbore is lined with a casing having a rated internal diameter and wherein an internal diameter of the casing is at least about 90% of the rated internal diameter throughout the length of the wellbore.

* * * * *

UNITED STATES PATENT AND TRADEMARK OFFICE
CERTIFICATE OF CORRECTION

PATENT NO. : 5,489,739
DATED : February 6, 1996
INVENTOR(S) : Angela S. Curry, Keith A. Seilhan, Charles A. LeBlanc It is certified that error appears in the above-indentified patent and that said Letters Patent is hereby corrected as shown below:

```
In the Abstract, patent reads    "internal
pressure within the container as the capsule
descends within the wellbore," patent should
read    --internal pressure within the container
as the container descends within
the wellbore,--
```

Signed and Sealed this

Eleventh Day of June, 1996

Attest:

BRUCE LEHMAN

Attesting Officer      Commissioner of Patents and Trademarks